March 14, 1950     H. KIHN     2,500,550
RADIO BOMB RELEASE SYSTEM
Filed Oct. 8, 1946
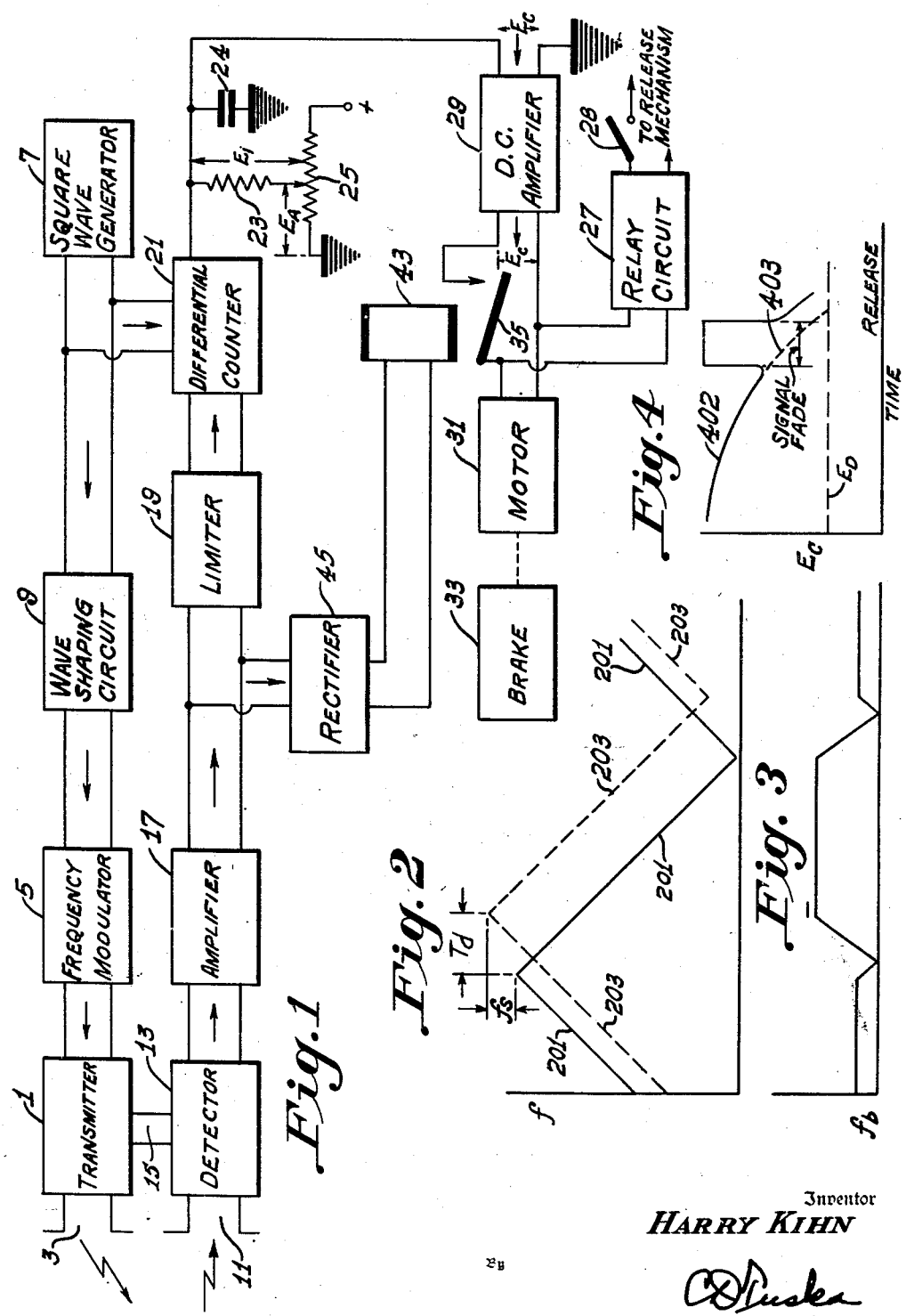
Inventor
HARRY KIHN
Attorney Patented Mar. 14, 1950

2,500,550

UNITED STATES PATENT OFFICE 2,500,550

RADIO BOMB RELEASE SYSTEM

Harry Kihn, Lawrenceville, N. J., assignor to Radio Corporation of America, a corporation of Delaware Application October 8, 1946, Serial No. 702,007

7 Claims. (Cl. 343—7)

1

This invention relates to radio bomb release systems, and more particularly to improvements in systems of the type which transmit a signal from the bombing craft to a selected target, receive the signal after reflection by the target, and compare the transmitted and received signals to determine the instant at which a bomb should be released to hit the target. One such system, using frequency modulated signals, is described in copending U. S. patent application Serial No. 524,794, now Patent No. 2,412,632, issued December 17, 1946, filed March 2, 1944 by Royden C. Sanders, Jr. and William R. Mercer and entitled Radio bomb release system.

Owing to occasional transmission over multiple paths, caused by reflection from the sea or terrain lying between the bomber and its target, the signal received at the bombing craft will fade, disappearing and returning at intervals as the target is approached. When the signal disappears, the effect is similar to that of a remote target, and the computer circuit tends to adjust itself accordingly. Upon reappearance of the signal, a certain amount of time is required for the computer to readjust to the true conditions. If this occurs just prior to the proper instant of release, no bomb will be dropped although the bomber may fly directly over the target.

The principal object of the present invention is to provide, in a system of the described type, means for preventing such failure to release, by extrapolation, during fading, of the latest available information.

Another object is to achieve the foregoing with a minimum of additional circuits and components, avoiding any substantial increase in weight and complication of the equipment.

The invention will be described with reference to the accompanying drawing, wherein:

Figure 1 is a schematic diagram of a bomb release system embodying the present invention, Figure 2 is a graph showing the variations in frequency of the signals transmitted and received in the operation of the system of Figure 1, Figure 3 is a graph showing the variations in frequency of a beat signal produced in the operation of the system of Figure 1, and Figure 4 is a graph showing typical variation, as a target is approached, of a control voltage produced in the operation of the system of Figure 1.

Refer to Figure 1, which illustrates a system like that disclosed in the aforementioned copending Sanders application. A radio transmitter 1, provided with an antenna 3, is connected to a frequency modulator 5. The modulator 5 may be of a suitable vibratory variable capacitor type, for example. A square wave generator 7 excites the modulator 5 through a wave shaping circuit 9, which integrates the square wave to produce substantially symmetrical triangular wave variation in the frequency of the transmitter 1.

A receiving antenna 11 is coupled to a detector 13. The transmitter 1 is also coupled to the detector 13 through a transmission line 15. The output of the detector 13 is applied to an amplifier 17, and thence through an amplitude limiter 19 to a differential counter circuit 21. The counter circuit 21 is of the type described in said Sanders Patent No. 2,412,632 comprising two averaging cycle counters provided with a common load resistor 23, arranged so that one provides a current flowing upward in the resistor 23 and the other provides a current flowing downward in the resistor 23. The counter 21 is electronically switched by square wave voltage from the generator 7, so that current flows down in the resistor 23 when the frequency of the transmitter 1 is increasing, and up when the transmitted frequency is decreasing.

The counter output circuit is biassed to a voltage $E_A$ by means of a voltage divider 25 connected across a D.-C. source with its adjustable tap connected to the lower end of the load resistor 23.

A relay circuit 27 is connected to energize a bomb release mechanism, not shown. An arming switch 28 is included between the relay 27 and the release mechanism. The relay circuit 27 is designed to actuate the release when the voltage of its input decreases to a predetermined value. One such relay circuit, using a cathode-input amplifier, is described in the above-mentioned Sanders application.

In the system of said Sanders application, the counter output is applied directly to the relay circuit. The present system differs therefrom in that a so-called "memory" circuit is provided between the counter and the relay. A D.-C. motor 31 is connected across the input terminals of the relay circuit 27. The motor 31 is mechanically coupled to a brake 33, which may be of any known type such as an eddy-current brake, a viscosity controlled device, or a simple friction brake. A D.-C. amplifier 29 is provided with its input circuit connected to the output of the differential counter 21. The output circuit of the amplifier 29 is connected to the input terminals of the relay circuit 27, and the motor 31, through a switch 35.

The switch 35 is controlled by an electromagnet 43, so that the switch 35 is closed only when the magnet 43 is energized. The coil of the magnet 43 is connected to the output of a rectifier 45, which is supplied from the output circuit of the audio amplifier 17.

The operation of the described system is as follows:

The transmitter 1 provides a frequency modulated signal which is radiated by the antenna 3. Some of the radiated energy strikes the target and is reflected back to the antenna 11 and applied to the detector 13, where it is mixed with transmitter output reaching the detector through the line 15.

Referring to Figure 2, the frequency of the transmitter output varies as shown by the solid line 201. The frequency of the signal received at the antenna 11 varies as shown by the dash line 203. The variations in the received signal are delayed with respect to those of the transmitted signal by a time $T_d$, which is the period required for radiation to travel from the antenna 3 to the target and back to the antenna 11, and hence is proportional to the distance, $d$. In addition (assuming the bomber is going toward the target) the frequency of the received signal is shifted upward owing to doppler effect. This upward shift $f_s$ is proportional to the speed of approach $s$ of the bomber to the target.

The output of the detector 13 includes a beat signal whose frequency $f_b$ is the difference in frequency of the transmitter output and the received signal. The beat frequency $f_b$ is lower during upsweep, or increase of transmitter frequency, than it is during downsweep, or decrease of transmitter frequency. The difference between the upper and lower values of $f_b$ is proportional to the speed $s$. The average value of $f_b$ is proportional to the distance $d$.

The beat output of the detector 13 is amplified by the amplifier 17, then limited to a constant amplitude by the limiter 19 and applied to the differential counter 21. The counter 21 provides, during upsweep, a current $i_u$ in the resistor 23, proportional to the lower value of the beat frequency $f_b$. During downsweep, the counter 21 produces a current $i_d$ in the opposite direction to the current $i_u$ and proportional to the upper value of the beat frequency $f_b$.

$$i_u = k_1(ad - bv)$$

and $$i_d = -k_2(ad + bv)$$

where $a$ and $b$ are constants determined in the design of the system, and $k_1$ and $k_2$ are the sensitivities of the counter circuit when operating positive and negative respectively. The average current in the resistor 23 (flowing downward) is $$i_a = (k_1 - k_2)ad - (k_1 + k_2)bv$$

and the resulting voltage drop (positive at the upper end of the resistor 23) is $$E_1 = Ad - Bv$$

where $$A = R(k_1 - k_2)a$$

and $$B = R(k_1 + k_2)b$$

The total potential at the upper end of the resistor 23, referred to ground, is $$E_c = E_1 + E_A$$

As the bomber approaches the target, $E_c$ decreases because $d$ is decreasing. The bias voltage $E_1$ and the constants $a$, $b$, $k_1$ and $k_2$ are determined with respect to each other in advance, making due allowance for the altitude H at which the bombing run is to be made, so that $E_c$ becomes equal to the voltage $E_D$ at which the relay is set to operate when $$\frac{d}{v} = \frac{2H}{g}$$

where $g$ is the acceleration of gravity, 32.2 feet per second per second.

The quantity $$\frac{d}{v}$$

is referred to hereinafter as the time from target, and is defined as the time which will be required under present conditions for the bomber to reach a point directly over the target. The quantity $$\frac{2H}{g}$$

is the time of fall, i. e. the time required for a bomb released at an altitude H to reach the ground. If release is effected when the time from target equals the time of fall, the bomb will strike the target.

Owing to the fact that the radio equipment measures the slant speed and slant distance rather than the horizontal components of speed and distance, the equipment must be adjusted so that $E_1$ follows an approximation rather than the true relation between speed and distance. This is described in detail in the above-mentioned Sanders application. It is sufficient for the purpose of the present description to note that $E_c$ decreases with decreasing time from target, and becomes equal to $E_D$ when the time from target is equal to the time of fall.

Now suppose that as the bomber approaches the target, the received signal fades out. The control voltage $E_c$, which has been decreasing in a substantially continuous manner (see Figure 4) immediately goes up to a maximum value corresponding to that which appears normally when the target is remote. This results from thermal noise in the detector 11, which causes the counter 21 to operate at random during both upsweep and downsweep, making both $i_u$ and $i_d$ large, as they would be with a distance target and substantially no velocity of approach.

This condition persists until the signal comes back again, whereupon the counter output current $i_A$ again bears the correct relationship to $d$ and $v$. However, the control voltage $E_c$ does not return immediately to the proper value, because the filter capacitor 24 must be discharged down to $E_c$. As illustrated in Figure 4, this may not occur until after the time from target has decreased to less than the time of fall, and in the above-described Sanders system release will take place too late, or not at all, depending upon whether or not $E_c$ gets down to $E_D$ before the bomber passes over the target and loses the signal entirely.

In the operation of the present system, the switches 28 and 35 are initially in the position shown in Figure 1. As soon as a usable target signal is picked up, the coil 43 is energized to close the switch 35. The output of the amplifier 29 energizes the motor 31, which then accelerates to a speed corresponding to the magnitude of the control voltage $E_c$. For the purpose of the present explanation, it is assumed that the voltage gain of the amplifier 29 is unity; it will be apparent, however, that the gain may be other than unity if the release voltage of the relay circuit 27 is adjusted accordingly.

As the bombing run is started, the arming switch 28 is closed, so that any subsequent operation of the relay circuit 27 will actuate the release mechanism. While $E_c$ decreases in the manner shown in Figure 4, the speed of the motor 31 decreases accordingly, so that its counter electromotive force is always approximately equal to $E_c$. When the received signal fades, the magnet 43 is deenergized and the switch 35 opens, isolating the motor 31 and the relay circuit 27 from the amplifier 29. The motor 31 continues to run under its own momentum, maintaining a counter electromotive force which is approximately equal to $E_c$.

The brake 33 is adjusted, taking into consideration the moment of inertia of the motor 31, so that the speed of the motor decreases at a rate corresponding to the normal rate of decrease of the control voltage $E_c$. It will be apparent to those skilled in the art that if the moment of inertia of the motor armature is insufficient in itself to provide the required deceleration, a flywheel may be connected to the motor shaft.

Thus the counter electromotive force, which is applied to the relay circuit 27, simulates the normal control signal which would be applied in the absence of feeding of the target signal.

If the signal returns before the bomber reaches the release point, the magnet 43 recloses the switch 35 and the relay 27 is again controlled by present information. If $E_c$ does not return to its proper value in time, release takes place anyway as soon as the motor has slowed up to provide a counter electromotive force equal to $E_d$.

In the event of intermittent fading throughout a considerable portion of the bombing run, the counter electromotive force of the motor 31 serves as the principal source of control voltage for the relay 27, and is checked from time to time and corrected if necessary by the control signal derived from the differential counter when a usable target return signal is received.

Although it is preferred at present to employ the arrangement of Figure 1 in the practice of the invention, the desired results may also be obtained by replacing the relay circuit 27 with a centrifugal or other speed responsive switch driven by the motor 31. The switch closes when the speed falls to that corresponding to $E_d$, whether or not a target signal is being received at the moment.

I claim as my invention:

1. In a bomb release system including on a mobile craft means transmitting a signal to a selected target, means receiving said signal after reflection from said target, and means responsive to said signal to provide a control voltage bearing a predetermined relationship to the time from target, a motor, means applying said control voltage to said motor whereby said motor runs at a speed substantially proportional to said time from target, and means responsive to reduction of the speed of said motor to a predetermined value to effect bomb release.

2. In a bomb release system including on a mobile craft means transmitting a signal to a selected target, means for receiving said signal after reflection by said target, computer means responsive to said transmitted and received signals to provide a control voltage bearing a predetermined relationship to the time from target, and relay means responsive to decrease of input voltage to a predetermined value to effect bomb release, a system for compensating the effects of fading or failure of said received signal including a motor connected across the input terminals of said relay means, and means normally connecting said motor and relay to said computer and responsive to failure of said received signal to disconnect said motor and relay means from said computer.

3. A bomb release system including, on a mobile craft, means transmitting a signal to a selected target and means for receiving said signal after reflection by said target to provide a control voltage bearing a predetermined relationship to the time from target, relay means responsive to decrease of input voltage to a predetermined value to effect bomb release, a motor connected across the input terminals of said relay means, means applying said control voltage to said relay and said motor and brake means coupled to said motor to reduce its speed at a predetermined rate upon failure of said signal, to thereby reduce its counter electromotive force at a rate approximating the normal rate of decrease of said control voltage.

4. In a bomb release system including on a mobile craft means transmitting a signal to a selected target, means receiving said signal after reflection from said target, and means responsive to said signal to provide a control voltage normally bearing a predetermined relationship to the time from target, a motor, means normally applying said control voltage to said motor whereby said motor runs at a speed substantially proportional to said time from target, means responsive to failure of said received signal to remove said control voltage from said motor, braking means coupled to said motor to cause deceleration thereof at a rate approximately proportional to the normal rate of decrease of said control voltage, and means responsive to reduction of the speed of said motor to a predetermined value to effect bomb release.

5. In a bomb release system including on a mobile craft means transmitting a signal to a selected target, means for receiving said signal after reflection by said target, computer means responsive to said transmitted and received signals to provide a control voltage bearing a predetermined relationship to the time from target, and relay means responsive to decrease of input voltage to a predetermined value to effect bomb release, and means applying said control voltage to said relay means, a system for compensating the effects of fading or failure of said received signal including a motor connected across the input terminals of said relay means, braking means coupled to said motor, and means responsive to failure of said received signal to disconnect said motor and said relay means from said computer.

6. In a bomb release system including on a mobile craft means transmitting a signal to a selected target, means receiving said signal after reflection from said target, and means responsive to said signal to provide a control voltage normally bearing a predetermined relationship to the time from target, a motor, means normally applying said control voltage to said motor whereby said motor runs at a speed substantially proportional to said time from target, means responsive to failure of said received signal to remove said control voltage from said motor, and means responsive to the speed of said motor to effect bomb release at a predetermined time from target.

7. A bomb release system including, on a mobile craft, means transmitting a signal to a selected target and means for receiving said signal after reflection by said target to provide a control voltage bearing a predetermined relationship to the time from target, relay means responsive to decrease of input voltage to a predetermined value to effect bomb release, a motor connected across the input terminals of said relay means, means normally applying said control voltage to said motor whereby said motor generates a counter electromotive force approximately equal to said control voltage, means responsive to failure of said received signal to disconnect said motor and relay from said receiving means, and brake means coupled to said motor to reduce its speed and thereby reduce said counter electromotive force at a rate aproximating the normal rate of decrease of said control voltage.

HARRY KIHN.

REFERENCES CITED

The following references are of record in the file of this patent:

UNITED STATES PATENTS

| Number | Name | Date |
| --- | --- | --- |
| 2,412,632 | Sanders et al. | Dec. 17, 1946 |